United States Patent [19]

Kitagawa et al.

[11] Patent Number: 4,639,713
[45] Date of Patent: Jan. 27, 1987

[54] THEFTPROOF DEVICE

[75] Inventors: Tadao Kitagawa, Kamifukuoka; Yutaka Kosuge, Sayama; Yoichiro Noda, Miyazaki, all of Japan

[73] Assignees: Honda Giken Kogyo K.K., Tokyo; Kabushiki Kaisha Honda Rokku, Miyazaki, both of Japan

[21] Appl. No.: 418,645

[22] Filed: Sep. 16, 1982

[30] Foreign Application Priority Data

| Sep. 18, 1981 | [JP] | Japan | 56-148265 |
| Sep. 18, 1981 | [JP] | Japan | 56-148266 |
| Sep. 19, 1981 | [JP] | Japan | 56-139435 |
| Oct. 9, 1981 | [JP] | Japan | 56-161842 |
| Oct. 9, 1981 | [JP] | Japan | 56-161843 |
| Oct. 9, 1981 | [JP] | Japan | 56-161845 |
| Oct. 23, 1981 | [JP] | Japan | 56-169585 |
| Jul. 23, 1982 | [JP] | Japan | 56-128579 |

[51] Int. Cl.$^4$ .............. B60R 25/00; G08B 13/14; G01V 9/04; H01J 5/16
[52] U.S. Cl. .................... 340/63; 340/568; 250/221; 250/222.1; 250/227; 350/96.1
[58] Field of Search .................. 340/63-65, 340/134, 568, 555, 556, 572; 280/289 L; 70/233; 356/73.1; 350/96.1-96.2, 96.24; 250/227, 221, 222.1; 455/610, 612

[56] References Cited

U.S. PATENT DOCUMENTS

| 3,792,284 | 2/1974 | Kaelin | 250/227 |
| 4,262,284 | 4/1981 | Stieff et al. | 340/568 |
| 4,284,290 | 8/1981 | Ragsdale | 280/289 L |
| 4,309,639 | 1/1982 | Thrower, Jr. et al. | 315/82 |
| 4,340,007 | 7/1982 | Hogwn | 340/63 |

Primary Examiner—John W. Caldwell, Sr.
Assistant Examiner—Tyrone Queen
Attorney, Agent, or Firm—Arthur L. Lessler

[57] ABSTRACT

A theftproof device comprising a flexible tying member, an optical fiber extending through the flexible tying member, a light emission element arranged opposite an end of the optical fiber, a light receiving element arranged opposite the other end of the optical fiber, a fixture fixed to an object to be protected from theft, an electrical circuit arranged within the fixture, mechanical connector means for mechanically connecting the flexible tying member to the fixture, and electrical connector means for electrically connecting the light emission element and the light receiving element to the electrical circuit. The electrical circuit is responsive to a change in a photo signal generated by the light emission element and transmitted through the optical fiber, for performing a warning function.

7 Claims, 23 Drawing Figures

THEFTPROOF DEVICE

BACKGROUND OF THE INVENTION

This invention relates to a theftproof device which includes an optical fiber extending through a flexible tying member, such as a wire cable, and operable to photoelectrically detect cutting of the flexible tying member, for giving warning.

A theftproof device for vehicles such as a motorcycle is conventionally used, which is of the so-called wire and lock type using a wire cable as a tying member. According to this conventional device, a vehicle, which is to be protected from theft, is tied to a solid structure, such as an electric pole, by means of the wire cable, in such a manner that two lock elements secured on the opposite ends of the wire cable are locked together.

However, vehicle thefts have recently increased in number due to diffusion of improved cutting tools, such as wire cutters, since the wire cable of the theftproof device can be easily cut by such improved cutting tools. To prevent this, a theftproof device has also been proposed and is actually used, which includes electric conductors or wires disposed through the wire cable, in which electric current permanently flows. The device is adapted to detect cutting of the electric conductors together with the wire cable, for giving warning.

However, this electric type device cannot avoid forming a roundabout circuit for electric current to flow therethrough, which can supersede the original electric cicuit formed in the wire cable to render same inoperative. As a consequence, there still occur a considerable number of vehicle thefts, wherein the wire cable is cut after the electric circuit therein has been rendered inoperative in the above manner.

OBJECT AND SUMMARY OF THE INVENTION

It is an object of the invention to provide a theftproof device having a novel construction using an optical fiber, which is adapted to detect, in a photoelectric manner without fail, cutting of its flexible tying member, such as a wire cable, through which the optical fiber extends, and which makes it very difficult to form a roundabout circuit for light transmitted through the optical fiber in the tying member.

The present invention provides a theftproof device comprising: an elongate flexible tying member; an optical fiber longitudinally extending through the flexible tying member; a light emission element arranged opposite an end of the optical fiber, for converting an electric signal supplied thereto into a corresponding photo signal; a light receiving element arranged opposite another end of the optical fiber, for converting a photo signal supplied thereto into a corresponding electric signal; a fixture fixed to an object which is to be protected from theft; mechanical connector means for locking at least one end of the flexible tying member to the fixture; an electrical circuit arranged within the fixture, for supplying an electric signal to the light emission element and also disposed to be supplied with an electric signal generated by the light receiving element; and electrical connector means for electrically connecting the light emission element and the light receiving element to the electrical circuit. Upon occurrence of a change in a photo signal generated by the light emission element and transmitted through the optical fiber, the electrical circuit is operable in response to a change in an electric signal supplied thereto from the light receiving element, which corrresponds to the above change in the photo signal, to perform a warning function.

The above and other objects, features and advantages of the invention will be more apparent from the ensuing detailed description taken in connection with the accompanying drawings.

DETAILED DESCRIPTION

Figure 1:
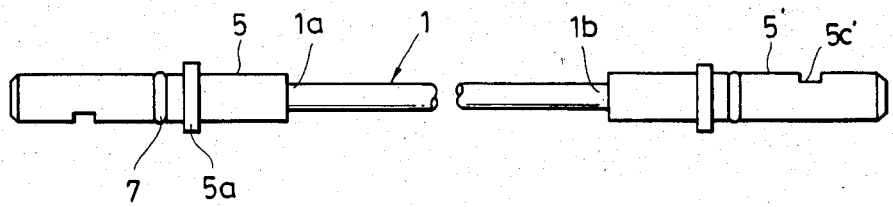
FIG. 1 is a schematic view of a first embodiment of a flexible tying member adapted for use in a theftproof device according to the present invention.

The theftproof device of the present invention will now described in detail with reference to the drawings, wherein like reference characters designate like or corresponding elements or parts throughout all the views.

Referring first to FIGS. 1 through 6, there is illustrated a first embodiment of the device of the invention. Reference numeral 1 designates a flexible tying member, which has an elongate configuration and carries connecting plugs 5 and 5' rigidly fitted on its opposite ends 1a and 1b, for respective engagement with sockets 21 and 21' of a main casing or fixture 20 appearing in FIG. 5. An optical fiber 2 extends through the flexible tying member 1 along its axis, which fiber has its outer peripheral surface coated with a synthetic resin, such as a vinyl resin, not shown. The flexible tying member 1 comprises a wire cable 3 formed of a plurality of stranded wires longitudinally extending over and closely helically wound around the coated outer peripheral surface of the optical fiber 2. The outer peripheral surface of the wire layer is also coated with a synthetic resin 4, such as a vinyl resin.

The plug 5, which is preferably formed of a hard metal material, has a generally cylindrical configuration and has its outer peripheral surface formed with a radial flange 5a and an annular groove 5b. An O-ring 7 is fitted in the annular groove 5b for waterproofing and dustproofing purposes. The outer peripheral surface of the plug 5 is further formed with an engaging recess 5c and a key way 5d axially extending from an open end 5f and terminating in an intermediate portion of the plug. The plug 5 has another or opposite end 5e in which an end portion 3a of the wire cable 3 is rigidly fitted and firmly secured thereto by means of caulking of the same end 5e. An opening 5g inwardly extends in the plug 5 from the open end 5f, in which a cylindrical support member 8 is accommodated. The support member 8 has an open end 8a in which an end of the optical fiber 2 is fitted, and another open end 8b in which a photoelectric element, e.g. a light emission diode 9 is fitted, as a light emission element. The light emission diode 9 has a light emission end face 9a disposed opposite an end face 2a' of the optical fiber 2 in relation spaced therefrom at a predetermined distance and aligned therewith. The end face 2a' of the optical fiber 2 and the light emission end face 9a of the light emission diode 9 are held in place by means of the support member 8.

A connector 10 is fitted in the open end 5f of the plug 5, with its connecting terminals 10a and 10c connected, respectively, to connecting terminals 9b and 9c of the light emission diode 9. A filler 11, such as a synthetic resin, is filled in the spatial portions of the plug 5 to hold the support member 8 and the connector 10 in place.

The plug 5' has a similar configuration to the plug 5. Its open end 5e' carries an end portion 3b of the wire cable 3 rigidly fitted and firmly secured therein by means of caulking of the same end portion 3b, while its other or opposite end 5f' carries a connector 10' fitted therein. A support member 8', which is disposed in a an opening 5g' of the plug 5', has an open end 8a' in which an end portion 2b of the optical fiber 2 is fitted, and another or opposite open end 8b' in which a light receiving element 15, such as a phototransistor, is fitted, with the light receiving end face 15a of the element 15 and the end face 2b of the optical fiber 2 disposed opposite each other in relation aligned and spaced at a predetermined distance. The light receiving element 15 has its connecting terminals 15b and 15c connected, respectively, to connecting terminals 10a' and 10c' of the connector 10'. The support member 8' and the connector 10' are held in place within the plug 5' by means of a filler 11, such as a synthetic resin, filled in the latter, in a manner similar to the plug 5. The accommodation of the light emission element and the light receiving element in the plugs 5 and 5' can provide complete protection of these elements, without using any special housing member. Further, the flexible tying member-plug unit can be compact in size, light in weight, and easy to assemble.

Figure 5:
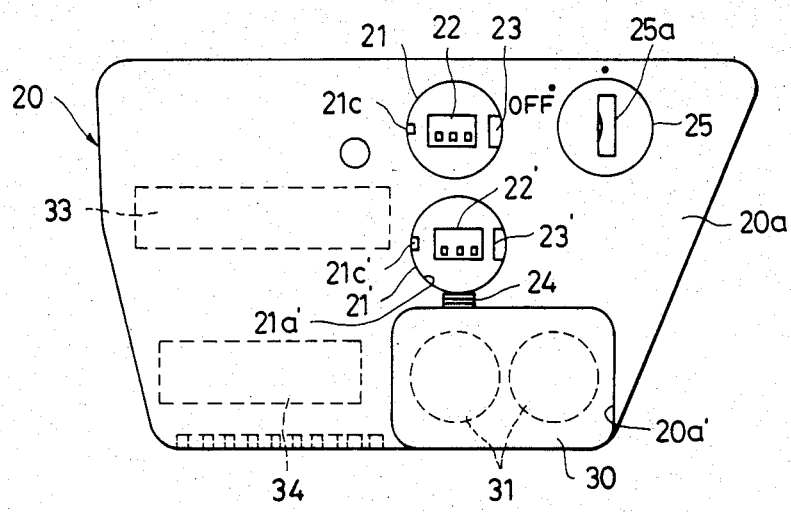
FIG. 5 is a front view of a main casing to which the flexible tying member of FIG. 1 is to be connected.
Figure 6:
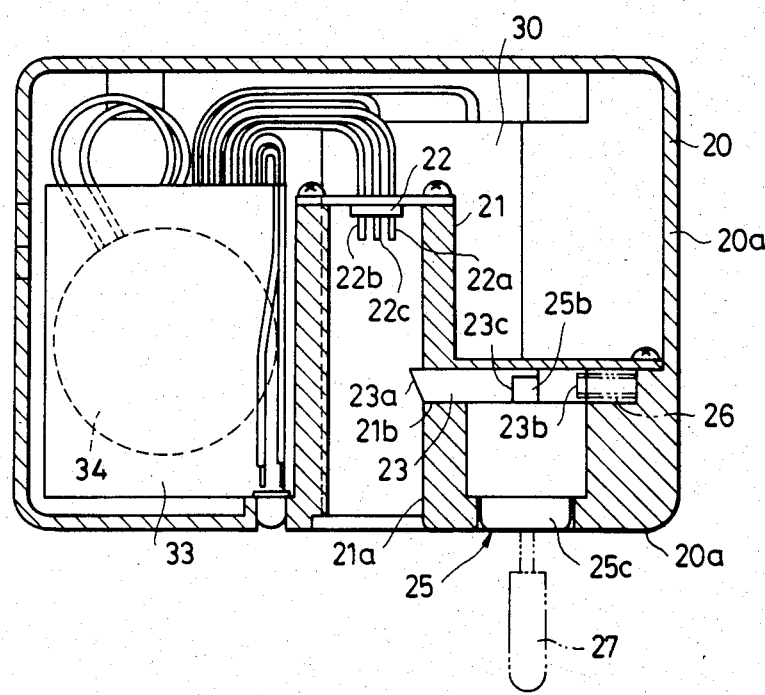
FIG. 6 is a sectional view of the main casing of FIG. 5.

As shown in FIG. 5, the main casing 20 has a body 20a provided with sockets 21 and 21', a lock 25 for locking engagement of the plugs 5, 5' with the sockets 21, 21', a power source casing 30, an electrical circuit 33, a warning device 34, etc. The socket 21, which is mounted in the front surface of the casing body 20a, has a generally cylindrical configuration and an opening having such an axial size as permits inserting therein the plug 5 until its radial flange 5a comes into contact with the front end edge of the socket 21. A connector 22 is mounted at the bottom of the socket 21 for engagement with the connector 10 of the plug 5, and an axial ridge 21c is formed on the inner surface of the peripheral wall 21a of the socket 21 at a predetermined location, for engagement with key way 5d of the plug 5. The inner surface of the peripheral wall 21a of the socket 21 is formed therein with a hole 21b, shown in FIG. 6, at a location which positionally corresponds to the engaging recess 5c of the plug 5 when the latter is inserted in the socket 21. Slidably fitted in the hole 21b is an engaging pin 23, which has an end 23a located in the connector-inserting opening of the socket 21, and has another or opposite end 23b spaced from an associated inner wall of the casing body 20a, between which is interposed a spring 26. The pin 23 has its substantially central portion formed therein with a hole 23c in which an actuator element 25b of the lock 25 is fitted. The lock 25 has a rotary element 25c, on which the actuator element 25b is eccentrically mounted, whereby rotation of a key 27 inserted in a key hole 25a formed in front end face of the rotary element 25c causes corresponding rotation of the rotary element 25c so that the actuator element 25b is displaced in unison with the rotation of the element 25c to move the pin 23 relative to the socket 21. When the device of the invention is in use, the pin 23 is biased to a leftward position as shown in FIG. 6, by the urging force of the spring 26, with its tip 23a projected into the connector-inserting opening of the socket 21. As the rotary element 25c is counterclockwise rotated toward its off position as shown in FIG. 5 against the force of the spring 26, through manual rotation of the key 27 inserted in the key hole 27a, the pin 23 is rightwardly moved until its tip 23a recedes into the hole 21b of the socket 21.

The socket 21' has a similar configuration and arrangement to the socket 21. That is, a connector 22' is mounted at the bottom of the connector-inserting opening of the socket 21' for engagement with the connector 10' of the plug 5', and an engaging pin 23', similar to the aforementioned pin 23, is fitted in a hole, not shown, formed in the peripheral wall of the socket 21'. This pin 23' is drivingly engaged with the above-mentioned pin 23, for movement in unison therewith as the key 27 is operated.

The power source casing 30 is dismountably mounted in an internal space 20a' formed in the front surface of a lower portion of the casing body 20a, for accommodating a power source 31, such as a battery. An engaging means 24, shown in FIG. 5, is arranged between the power source casing 30 and the socket 21', for retaining the power source casing 30 in the casing body 20a in cooperation with the plug 5'. This engaging means 24 remains inoperative when the plug 5' is not inserted into the socket 21', as in the illustrated position, whereby it permits free removal of the power source casing 30 from the casing body 20'. When the plug 5' is inserted into the socket 21', an engaging pin, not shown, provided on the engaging means 24 is urgedly displaced by the outer periphery of the plug 5' into a recess, not shown, formed in the surface of the power source casing 30 to unremovably lock the casing 30 in the casing body 20a.

Figure 7:
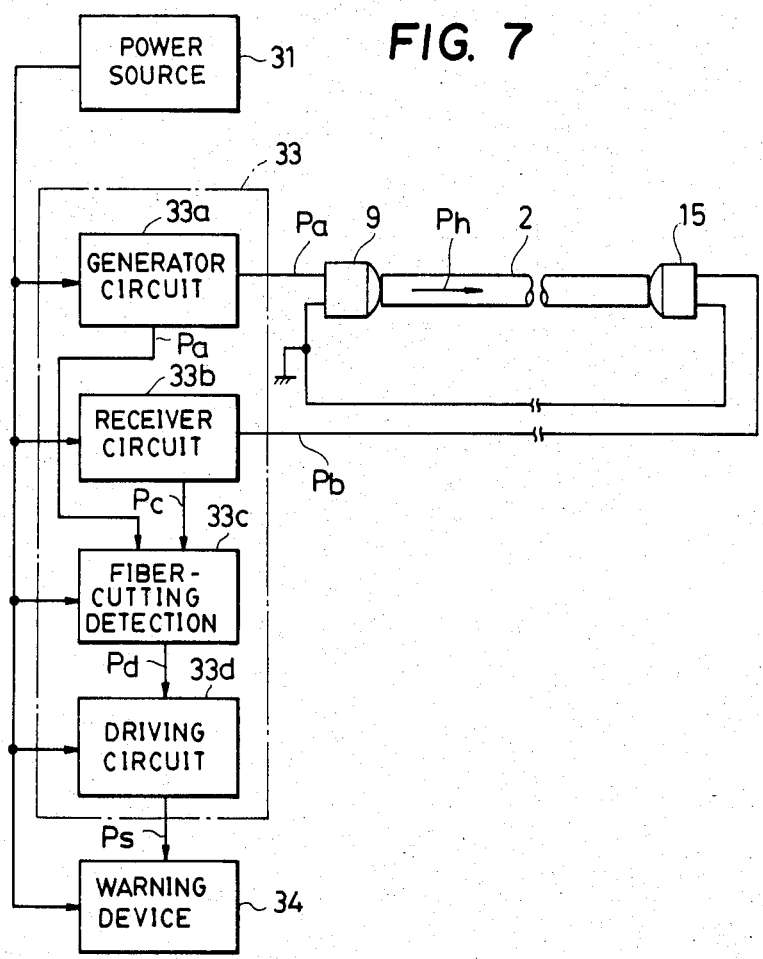
FIG. 7 is a block diagram of an embodiment of an electrical circuit adapted for use in the device of the present invention.

As shown in FIG. 7, the electrical circuit 33 comprises a generator circuit 33a, a receiver circuit 33b, a fiber-cutting detecting circuit 33c and a driving circuit 33d. The generator circuit 33a can be formed of a pulse generator, which is adapted to generate an electric pulse signal Pa having a predetermined constant pulse repetition period. The light emission element or diode 9, which is adapted to convert an electric signal into a corresponding photo signal, is operable in response to the pulse signal Pa to generate a corresponding photo pulse signal Ph. This photo pulse signal Ph is transmitted through the optical fiber 2. The light receiving element or phototransistor 15, which is adapted to convert a photo signal into a corresponding electric signal, is operable in response to the photo pulse signal Ph inputted thereto through the optical fiber 2 to generate a corresponding electric signal Pb. The receiver circuit 33b is arranged to receive and detect the signal Pb supplied thereto from the light receiving element 15 to generate a corresponding electric signal Pc. The fiber-cutting detecting circuit 33c is arranged to be supplied with the pulse signals Pa and Pc, respectively, from the generator circuit 33a and the receiver circuit 33b for detection of disconnection or cutting of the optical fiber 2, depending upon the input signals. For instance, it can be adapted to determine fulfillment of an AND condition between the levels of the signals Pa and Pc to generate an abnormality-indicative signal Pd when it determines that the AND condition is not fulfilled. The fiber-cutting detecting circuit 33c is also arranged to detect the connections between the connectors 10, 10' of the plugs 5, 5' and the connectors 22, 22' of the sockets 21, 21' to turn the power source 31 on when it detects that the connections are all established, that is, the plugs 5 and 5' are both mounted in their respective sockets 21 and 21', and to turn the power source 31 off when either one of the connections is not established, that is, either one of the plugs 5 and 5' is not engaged in its corresponding socket 21 or 21'. The driving circuit 33d, which is adapted and arranged to actuate the warning device 34, is responsive to the input signal Pd to generate a driving signal Ps. The warning device, which can be formed of a buzzer, is responsive to the input driving signal Ps to give an alarm. The main casing 20 constructed above can be fixedly mounted on a motorcycle or the like at a predetermined location.

Figure 8:
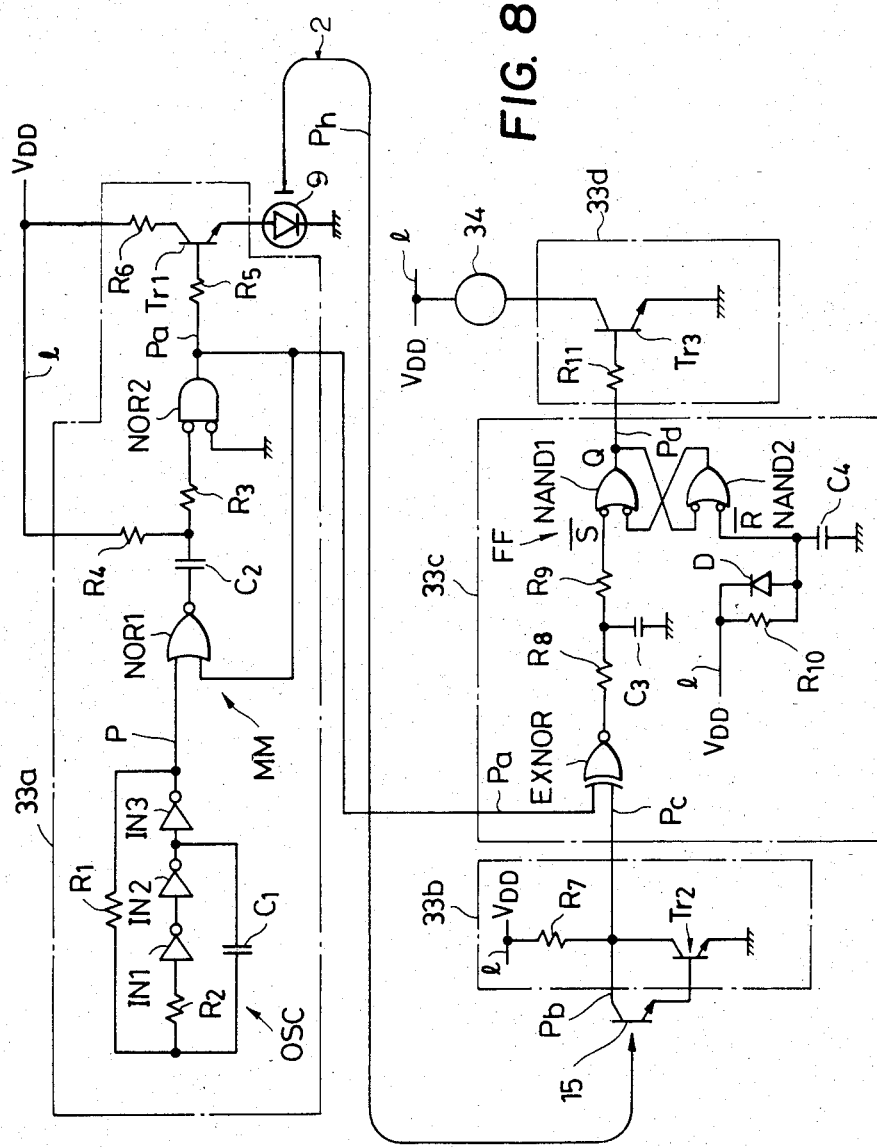
FIG. 8 is a circuit diagram illustrating in detail the electrical circuit of FIG. 7.

FIG. 8 illustrates details of the electrical circuit 33 in FIG. 7. The generator circuit 33a comprises an oscillator OSC formed substantially of inverters IN1-IN3 serially connected to each other. The inverter IN3 has its output terminal connected to an input terminal of a NOR circuit NOR1 forming a monostable multivibrator MM directly, and also to the input terminal of the inverter IN1 by way of resistances R1 and R2. A capacitor C1 is connected between the output terminal of the inverter IN2 and the junction of the resistance R1 with the resistance R2. The NOR circuit NOR1 of the monotsable multivibrator MM has its output terminal connected to an input terminal of another NOR circuit NOR2 by way of a capacitor C2 and a resistance R3. The NOR circuit NOR2 has its other input terminal grounded. The NOR circuit NOR2 has its output terminal connected to the base of an NPN transistor Tr1 by way of a resistance R5, and also to the other input terminal of the NOR circuit NOR1 as well as an input terminal of an exclusive NOR circuit EX NOR of the fiber-cutting detecting circuit 33c. The transistor Tr1 has its emitter grounded by way of the light emission diode 9 and its collector connected to a feeder line 1 by way of a resistance R6. The junction of the capacitor C2 with the resistance R3 is connected to the feeder line 1 through a resistance R4.

The receiver circuit 33b has a transistor Tr2 which has its collector connected to the feeder line 1 by way of a resistance R7, and its emitter grounded. Connected, respectively, to the junction of the collector of the transistor Tr2 with the resistance R7 and the base of the transistor Tr2 are the collector and emitter of the phototransistor forming the light receiving element 15.

The exclusive NOR circuit EX NOR of the fiber-cutting detecting circuit 33c has its other input terminal connected to the junction of the collector of the transistor Tr2 with the resistance R7, and its output terminal connected to the set pulse input terminal S of a NAND circuit NAND1 of a latch or flip flop circuit FF, by way of resistances R8 and R9. A capacitor C3 is connected between the junction of the resistance R8 with the resistance R9 and the ground. The NAND circuit NAND1 has its output terminal Q connected to an input terminal of another NAND circuit NAND2 which in turn has its output terminal connected to the other input terminal of the NAND circuit NAND1. The NAND circuit NAND2 has a reset pulse input terminal R grounded through a capacitor C4. A resistance R10 and a diode D are connected in parallel between the junction of the above input terminal R of the NAND circuit NAND2 with the capacitor C4 and the feeder line 1.

The output terminal Q of the NAND circuit NAND1 is connected to the base of a transistor Tr3 of the driving circuit 33d by way of a resistance R11, and the transistor Tr3 has its collector connected to the feeder line 1 by way of the warning device 34, and its emitter grounded.

To use the theftproof device arranged above, first, the flexible tying member 1 is wound around a solid structure, such as an electric pole, not shown, and then the plugs 5 and 5' at the opposite ends of the tying member 1 are inserted into their respective sockets 21 and 21' to engage their connectors 10 and 10' with their respective connectors 22 and 22'. In inserting the plugs 5 and 5' into the sockets 21 and 21', the pins 23 and 23' are forced into the peripheral walls of the sockets by the outer peripheries of the plugs. When the plugs 5 and 5' are fully inserted into the sockets 21 and 21', the pins 23 and 23' are projected by the force of the springs 26, etc. into engagement with the engaging recesses 5c and 5c' of the plugs 5 and 5' to retain the plugs 5 and 5' in the sockets 21 and 21' of the casing body 20a. Thus, the flexible tying member 1 is looped to firmly tie the vehicle or the like to the solid structure.

Figure 9:
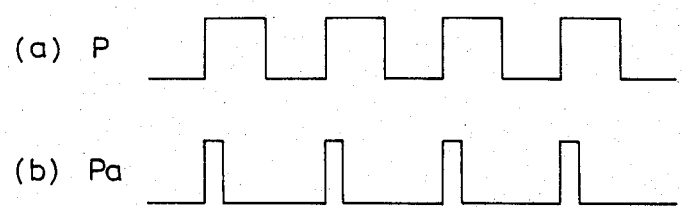
FIG. 9 is a timing chart of signals P and Pa which are generated in the circuit of FIG. 8.

When the plugs 5 and 5' are thus fully mounted into the casing body 20a, the fiber-cutting detecting circuit 33c turns the power source 31 on, as previously noted, to render the electrical circuit 33 operative by its supply power. Then, the inverter IN3 of the oscillator OSC of the generator circuit 33a generates an electric pulse signal P with a pulse duty factor of about 50 percent as shown in FIG. 9(a). The frequency of the pulse signal P is determined by the time constant of the resistance R1 and the capacitor C1. The monostable multivibrator MM operates on the input pulse signal P to generate an electric pulse signal Pa as shown in FIG. 9(b), which has a narrower pulse width with a shorter on-state period and a longer off-state period. The pulse width or on-state period period of the pulse signal Pa is determined by the time constant of the resistance R4 and the capacitor C2. The transistor Tr1 is alternately turned on and off in response to the input pulse signal Pa to intermittently energize the light emission diode 9, with its lighting period equal to the pulse width or on-state period of the pulse signal Pa. The pulse width of the pulse signal Pa is set at a suitable value in view of the operating characteristics and power consumption of the light emission element 9 and the light receiving element 15, etc. The light emission diode 9 generates a photo pulse signal Ph having a pulse width corresponding to the pulse width of the pulse signal Pa, which is transmitted through the optical fiber 2 in the flexible tying member 1.

After passing through the optical fiber 2, the photo pulse signal Ph is converted into an electric pulse signal having a pulse width corresponding to the pulse width of the photo pulse signal Ph, by means of the light receiving element or phototransistor Tr2, and then applied to the transistor Tr2. The transistor Tr2 in turn generates a pulse signal Pc having a pulse width corresponding to the input pulse signal. The exclusive NOR circuit EX NOR compares ther pulse signals Pa and Pc to determine if they are coincident with each other. That is, when the two input signals Pa and Pc are both at a high level or at a low level, that is, when there is no disconnection or cutting in the optical fiber 2, it outputs a signal having a high level. The exclusive NOR circuit EX NOR outputs a signal having a low level when either one of the input pulse signals Pa and Pc is at a low level, that is, when there occurs a disconnection or cutting in the optical fiber 2.

The flip flop circuit FF is adapted to generate an output having a low level when its input set pulse has a high level. This low level output keeps the transistor Tr3 deenergized to keep the warning device 34 inoperative. That is, since there is no disconnection or cutting in the optical fiber 2, the warning device 34 remains inoperative. When the power source is set on, a reset pulse is applied to the NAND circuit NAND2 with a time delay corresponding to the time constant of the resistance R10 and the capacitor C4 to keep the output of the NAND circuit NAND1 at a low level, to thereby hold the warning device 34 inoperative. Since there can occur a time delay td between the pulse signal Pa and the pulse signal Pc, which are inputted to the exclusive NOR circuit EX NOR, so that the same circuit can generate a pulse signal having a pulse width corresponding to the above time delay td, a delay circuit is formed by the resistance R8 and the capacitor C3 for prevention of such phenomenon.

When the flexible tying member 1 is cut to cause simultaneous cutting of the optical fiber 2, the transistor Tr2 of the receiver circuit 30b is turned off to interrupt the generation of the output pulse signal Pc. As a consequence, the output level of the exlcusive NOR circuit EX NOR goes low to render the output level of the NAND circuit NAND1 high, which turns the transistor Tr3 on to render the warning device 34 operative to warn the driver or someone else of the theft.

The above described arrangement of utilizing a photo signal in the form of a photo pulses having a constant pulse repetition period, which is generated by the light emission element, transmitted through the optical fiber and received by the light receiving element contributes to a large reduction in the power consumption and ensures long term stable operation of the device.

To remove the flexible tying member 1 from the casing body 20a, the key 27 is inserted into the key hole 25a of the lock 25, shown in FIG. 6, mounted in the casing body 20a to rotate the lock 27 to its off position (FIG. 5). At this off position, the engaging pins 23 and 23' become disengaged from their respective engaging recesses 5c and 5c' and recede into the peripheral walls of the sockets 21 and 21' to permit disengaging the plugs 5 and 5' from their respective sockets 21 and 21'. Then, the flexible tying member 1 can be removed from the casing body 20a. On this occasion, the power source 31 automatically turns off to keep the warning device 34 inoperative, as previously noted. Thus, the vehicle or the like can be protected from theft.

Figure 10:
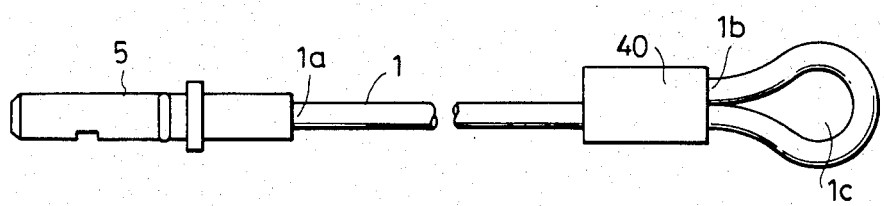
FIG. 10 is a schematic view of a second embodiment of the flexible tying member for use in the device of the present invention.
Figure 11:
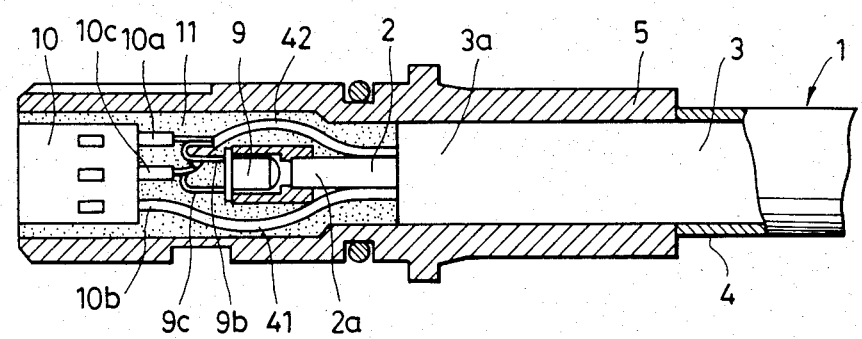
FIG. 11 is a longitudinal sectional view of the plug of FIG. 10.
Figure 12:
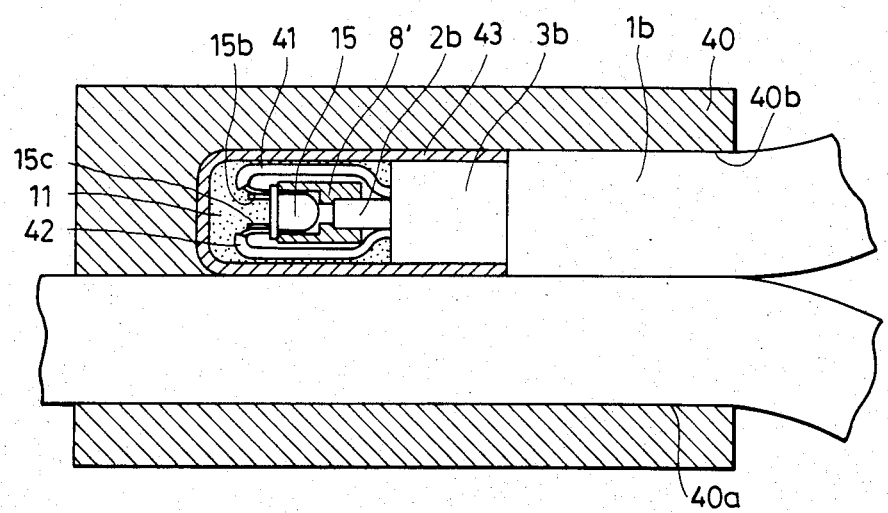
FIG. 12 is a longitudinal sectional view of a caulking member appearing in FIG. 10.

FIGS. 10 through 14 illustrate a second embodiment of the flexible tying member 1. The flexible tying member 1 carries a plug 5 secured on the end 1a in a manner similar to the previous embodiment. A portion of the tying member 1 including the other end 1b is formed as a loop 1c, wherein the end 1b is located within a caulking metal holder 40 and firmly joined with another end of the loop 1c located within the same holder 40, by caulking the latter. The flexible tying member 1 is formed by a wire cable 3, as shown in FIG. 11, which is similar to the one employed in the previous embodiment, but it contains two electric wires 41 and 42 extending parallel with the optical fiber 2 along the axis of the wire cable 3. The electric wires 41 and 42 have their one ends connected, respectively, to the connecting terminal 10b and earthing terminal 10c of the conenctor 10, and their other ends to the output terminal 15b and earthing terminal 15c of the light receiving element 15, as shown in FIG. 12. The wire cable 3 has an end 3b secured to a cylindrical capsule 43 having one end closed and the other end opened, by means of caulking of the holder 40. A support member 8' is protectedly disposed within the capsule 43, which supports an end 2b of the optical fiber 2 and the light receiving element 15 arranged therein in alignment with each other. A filler 11, similar to the one in the previous embodiment, is filled in the capsule 43 to firmly retain the support member 8' in place. The capsule 43 is formed of a hard metal material similar to that of the plug 5.

The capsule 43 is mounted within the metal holder 40. To assemble the looped portion of the flexible tying member 1, the end 3b of the wire cable 3 carrying the capsule 43 is passed through a through hole 40a formed in the metal holder 40 to form the small loop 1c as seen in FIG. 10, and then fitted into a blind hole 40b formed in the metal holder 40 and extending parallel with the through hole 40a, as shown in FIG. 12. Then, the metal holder 40 is caulked by applying pressure to its outer peripheral surface to firmly retain the capsule 43 in the blind hole 40b. The capsule 43, which is made of a hard metal material, will not crush during the caulking operation to keep the support member 8', the light receiving element 15, etc. therein from damage.

Figure 13:
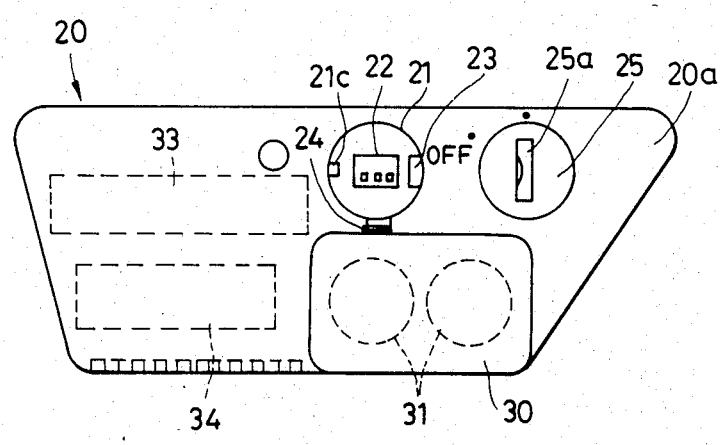
FIG. 13 is a front view of a modification of the main casing.

To couple the flexible tying member 1 of the second embodiment to the main casing 20, the main casing 20 has only to be provided with a single socket 21 alone as shown in FIG. 13. The manner of coupling the present flexible tying member to the main casing 20 is similar to that previously described with reference to FIGS. 5 and 6, description of which is, therefore, omitted here. Also, the other parts or elements of the present embodiment are arranged and constructed in a manner similar to the first embodiment previously described, description of which is also omitted here. Further, an electrical circuit similar to the one appearing in FIGS. 7 and 8 is applicable to the flexible tying member of the present embodiment, as well, except that in the present embodiment, the fiber-cutting detecting circuit 33c is adapted to detect the connection between the connector 10 of the plug 5 and the connector 22 of the socket 21 of the casing body 20a, to turn the power source 31 on or off, depending upon the detected connection state. Further, the electrical circuit may be arranged to render the warning device 34 operative even when there occurs disconnection or cutting of the electric wires 41 and 42, as well as in the event of disconnection or cutting of the optical fiber 2.

Although in the illustrated second embodiment, the light emission element is arranged in the plug and the light receiving element in the capsule 43, respectively, the light receiving element may be arranged in the plug, and the light emission element in the capsule, respectively.

Figure 14:
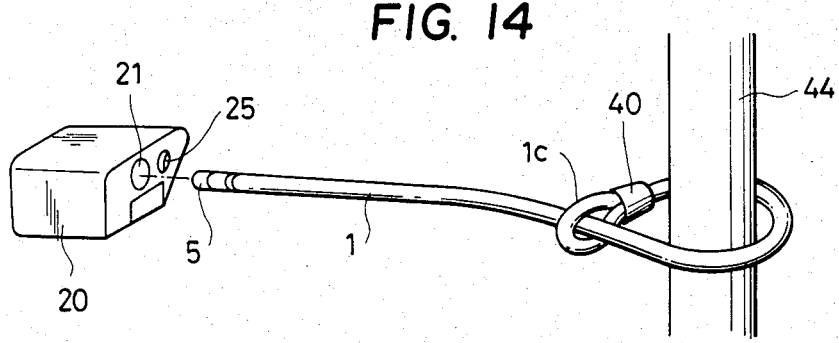
FIG. 14 is a view showing a manner of using the device of the present invention, which is provided with the flexible tying member according to the second embodiment.

To tie a vehicle or the like to a pole, for instance, by means of the flexible tying member of the second embodiment, first, the flexible tying member 1 is wound round the pole 44, as shown in FIG. 14, and then the plug 5 is passed through the small loop 1c, followed by fitting the plug 5 into the socket 21 of the main casing 20.

According to the present embodiment, either the light emission element or the light receiving element, which is arranged within the capsule in the robust caulking metal holder, can be fully protected from external force applied to the metal holder.

Figure 15:
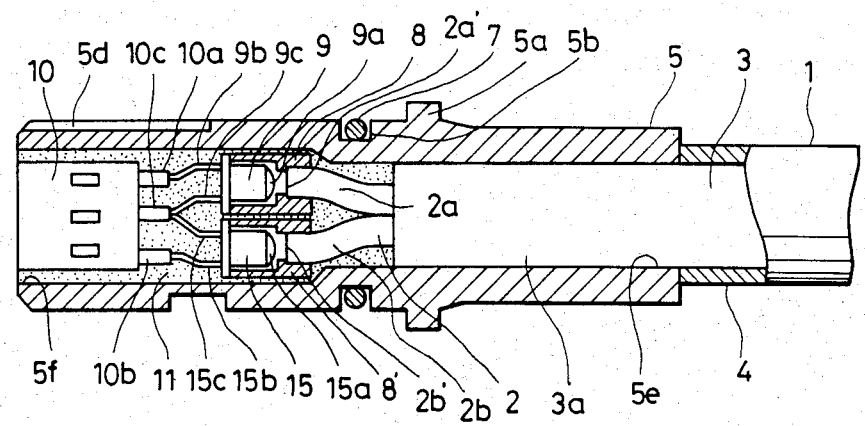
FIG. 15 is a longitudinal sectional view of a plug arranged at an end of the flexible tying member according to a third embodiment.
Figure 16:
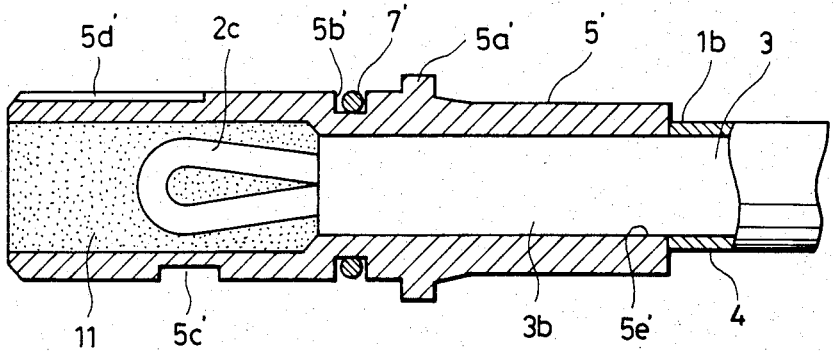
FIG. 16 is a longitudinal sectional view of another plug arranged at the opposite end of the flexible tying member of the third embodiment.

Referring next to FIGS. 15 and 16, there is illustrated a third embodiment of the flexible tying member 1. An optical fiber 2 is disposed in the flexible tying member 1 along its axis, which is folded at a substantially axially central portion 2c in halves extending parallel with each other. Both of the opposite ends 2a and 2b of the optical fiber 2 are located within a plug 5 which is secured to an end of the flexible tying member 1. Also located within the plug 5 are two support members 8 and 8'. The optical fiber 2 has its one end 2a fitted in an open end of the support member 8 and its other end 2b in an open end of the other support member 8', respectively. The other ends of the support members 8 and 8' receive a light emission element 9 and a light receiving element 15, respectively. Received in an open end 5f of the plug 5 is a connector 10 which has its input terminals 10a and 10b connected, respectively, to the positive connecting terminals 9b and 15b of the light emission element 9 and the light receiving element 15. The connector 10 also has its earthing terminal 10c connected to the negative connecting terminals 9c and 15c of the two elements 9 and 15.

A plug 5', which is secured to the other end of the flexible tying member 1 and has an identical configuration with the plug 5, has an open end 5e' in which an end 3b of a wire cable 3 is fitted and secured thereto by caulking the plug 5'. The plug 5' accommodates therein the folded central portion 2c of the optical fiber 2 located at the end 3b of the wire cable 3. the plug 5' has its spatial portions also filled with a filler 11 to retain the folded central portion 2c in place for protection from damage.

The other parts of the present embodiment are arranged in a substantially identical manner to the first embodiment, description of which is, therefore, omitted here. Although an electrical circuit similar to the one shown in FIGS. 7 and 8 may be applicable to the present embodiment, the fiber-cutting detecting circuit 33c according to the present embodiment should be adapted to detect the connection of the connector 10 of the plug 5 with the connector 22 of the socket 21 of the casing body 20a to turn the power source 31 on or off, depending upon the detected connection state.

Figure 17:
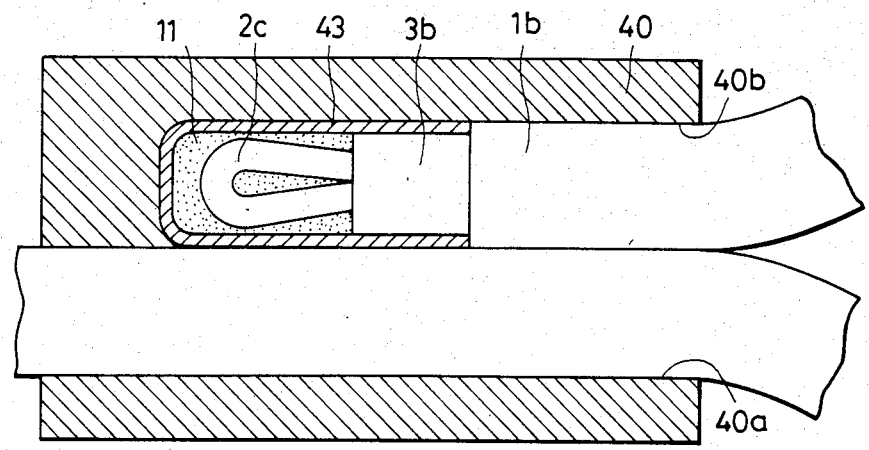
FIG. 17 is a longitudinal sectional view of a fourth embodiment of the flexible tying member.

FIG. 17 illustrates a fourth embodiment of the flexible tying member 1, according to which a folded central portion 2c of an optical fiber 2, similar to the one shown in FIG. 16, is accommodated in a caulking metal holder 40 similar to the one shown in FIG. 12. The folded portion 2c of the optical fiber 2 at the end 3b of the wire cable 3 is located within a capsule 43 similar in construction and material to the one shown in FIG. 12, which is securely caulked to the end 3b of the wire cable 3. A filler 11 is also filled in the spatial portions of the capsule 43. Since the manner of mounting the capsule 43 into the caulking metal holder 40 and the stucture of the main casing 20a, to which the present tying member 1 is to be coupled, can be identical with those according to the second embodiment previously described, description of which is, therefore, omitted here.

Figure 18:
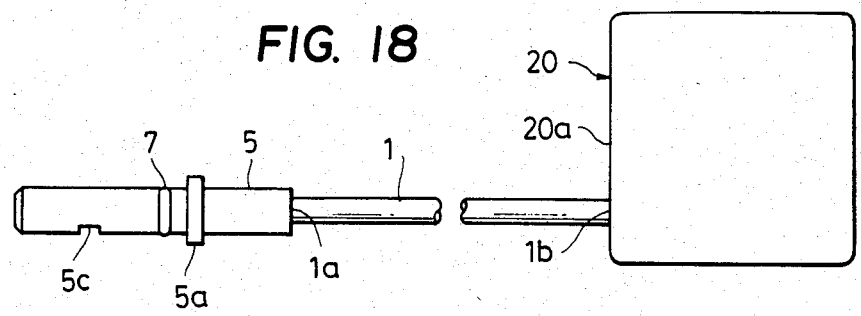
FIG. 18 is a schematic view of a fifth embodiment of the flexible tying member.
Figure 19:
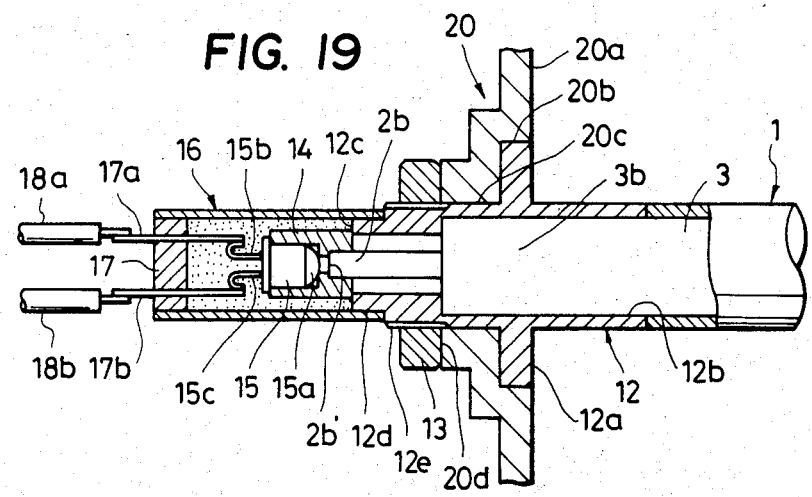
FIG. 19 is a longitudinal sectional view showing a manner of connection between an end of the flexible tying member of FIG. 18 and the main casing.

FIGS. 18 and 19 illustrate a fifth embodiment of the flexible tying member 1. While the flexible tying member 1 has its end 1a securedly fitted in the plug 5 in a manner similar to the preceding embodiments, the other end 1b of the tying member 1 is permanently fixed to the casing body 20a of the main casing 20. As best shown in FIG. 19, the other end 1b of the tying member 1 is secured to a holder 12 which is fixed to the casing body 20a. The holder 12 has a generally cylindrical configuration and has its substantially central peripheral portion formed integrally with a radial flange 12a. The holder 12 has an axial through hole 12b in which the end 3b of the wire cable 3 of the flexible tying member 1 is fitted and rigidly secured to the holder 12 by caulking the latter. The holder 12 has a narrowed end portion 12d extending from an open end 12c, and a threaded portion 12e extending from the narrowed end portion 12d toward the radial flange 12a. On the other hand, the casing body 20a has its front wall formed, at a predetermined location, with an opening formed by a first or outer portion 20b having a larger diameter and a second or inner portion 20c having a smaller diameter, through which opening the holder 12 is inserted into the casing body 20a from outside. When fully fitted into the casing body 20a, the holder 12 has its flange 12a disposed in contact with an end face of the first portion 20b of the casing body 20a, and its threaded portion 12e projected into the interior of the casing body 20a. The holder 12 is firmly fixed to the casing body 20a by means of a nut 13 threadedly fitted on the threaded portion 12e.

A cylindrical casing 16 is rigidly fitted, at an end, on the narrowed end portion 12d of the holder 12, and accommodates a support member 14, which is similar in construction to the support member 8. The support member 14 has an open end in which an end 2b of the optical fiber 2 is received and another or opposite end in which a light receiving element 15 is received. The end face 2b' of the end 2b of the optical fiber 2 is disposed opposite the light receiving end face 15a of the light receiving element 15 in relation spaced therefrom at a predetermined distance and aligned therewith. The other end of the casing 16 receives a connector 17 fitted therein, which has its connecting terminals 17a and 17b connected, respectively, to the connecting terminals 15b and 15c of the light receiving element 15, as well as to associated connecting terminals of an electrical circuit, not shown, which can be similar in construction to the one shown in FIG. 7, by means of electric wires 18a and 18b. The electrical circuit is also mounted within the casing body 20a. A filler 11 is filled in the casing 16 to retain the support member 14 in place for protection of the end 2b of the optical fiber 2 and the light receiving element 15 from damage.

Figure 2:
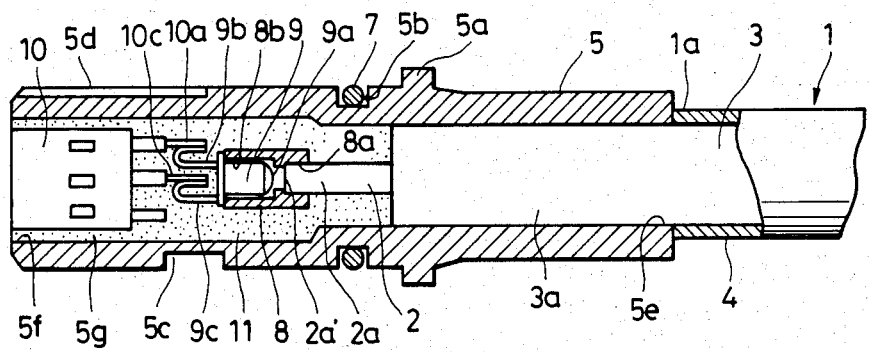
FIG. 2 is a longitudinal sectional view of a plug arranged at an end of the flexible tying member of FIG. 1.
Figure 3:
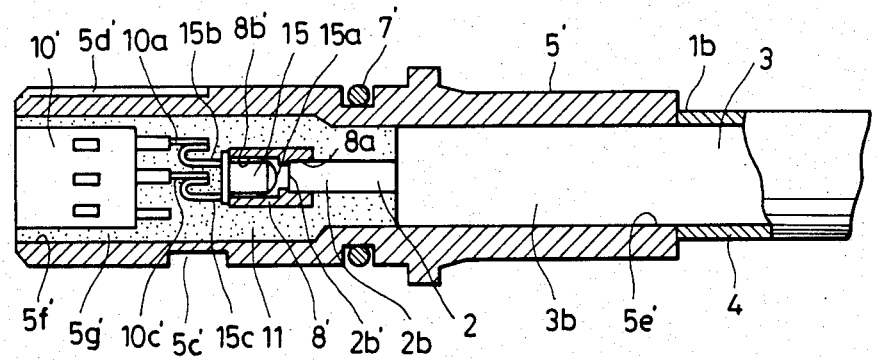
FIG. 3 is a longitudinal sectional view of another plug arranged at the other end of the flexible tying member of FIG. 1.
Figure 4:
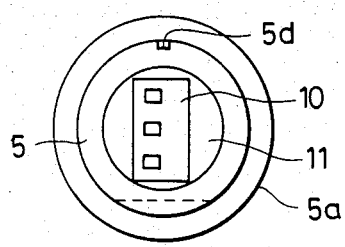
FIG. 4 is an end view of the plug of FIG. 3.
Figure 20:
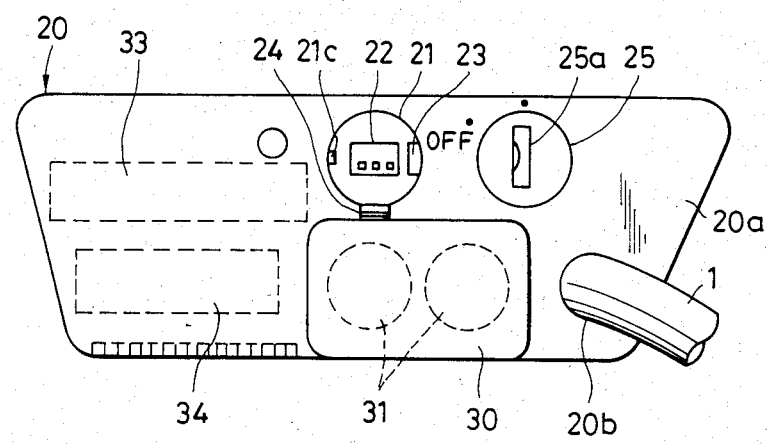
FIG. 20 is a front view of a main casing to which the flexible tying member of FIG. 18 is to be connected.

On the other hand, the configuration and interior construction of the plug 5 secured to the end 1a of the flexible tying member 1 are similar to those of the one shown in FIG. 2, description and illustration of which are, therefore, omitted here. The casing body 20a of the main casing 20, to which the present flexible tying member 1 is to be coupled, has a front surface arrangement as shown in FIG. 20, which is substantially identical with that of the casing body shown in FIG. 13, except that the casing body 20a in FIG. 20 is also formed with the opening 20b through which the holder 20 is mounted into the casing 20.

The theftproof device according to any of the aforedescribed embodiments is adapted to detect cutting of the flexible tying member, by utilizing light transmission through the optical fiber, which makes it very difficult to form a roundabout circuit for transmission of light and is, therefore, capable of positively detecting cutting of the tying member without fail. Further, the electrical connection of the tying member with the main casing facilitates the operation of coupling the tying member to the main casing, and can ensure normal operation even with dirt or stains deposited on the electrically connecting portions of the tying member and the main casing.

Although, in all the above stated embodiments, the flexible tying member comprises a wire cable, the wire cable is not limitative, but a flexible bellows-type tubular member formed of a hard metal material may also be used for the tying member, for instance.

The theftproof device according to the invention is used to connect an object to be protected from theft, such as a motorcycle, to a structure such as an electric pole, as previously described with reference to FIG. 14. The main casing 20 is fixed to the object in a manner that it cannot be easily removed from the main casing. For complete prevention of theft, the main casing 20 needs to be mounted on the object at a portion having sufficient structural strength.

Figure 23:
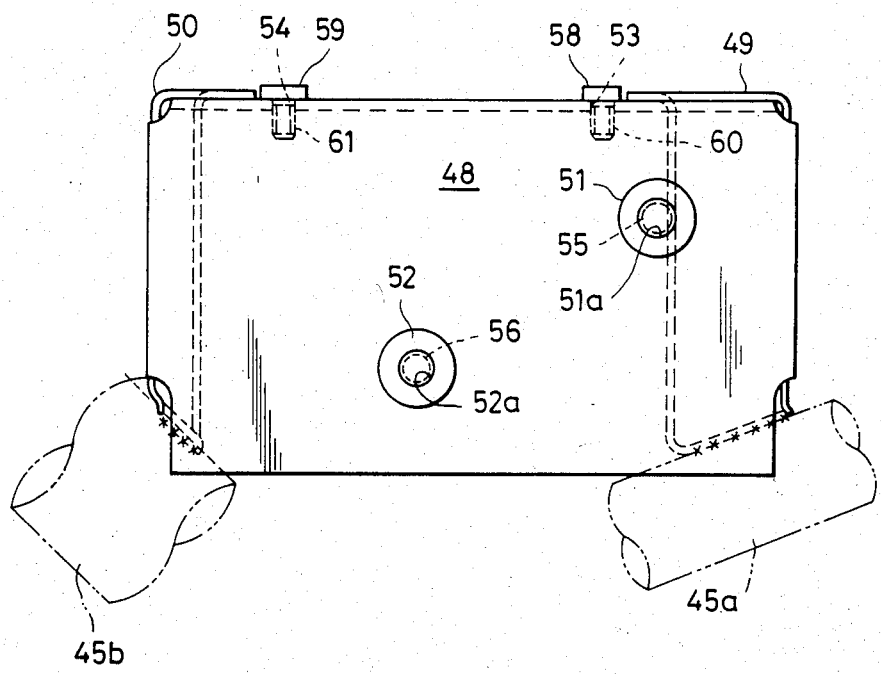
FIG. 23 is a top plan view, on an enlaged scale, of the same portion of the motorcycle of FIG. 21.
Figure 21:
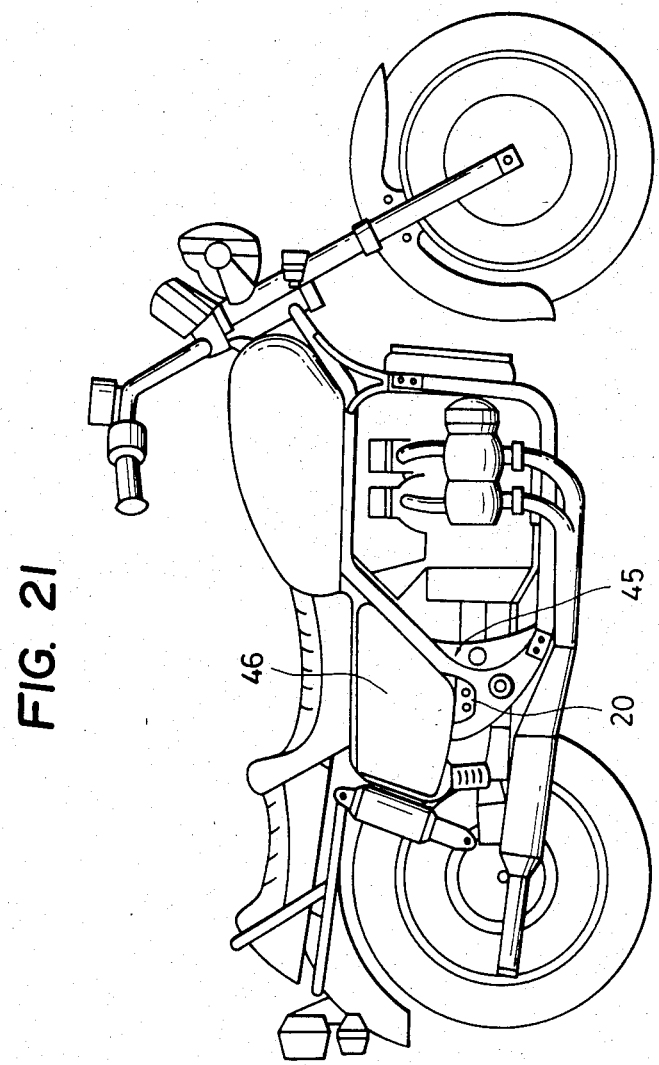
FIG. 21 is a side view of a motorcycle on which the device of the present invention is mounted.
Figure 22:
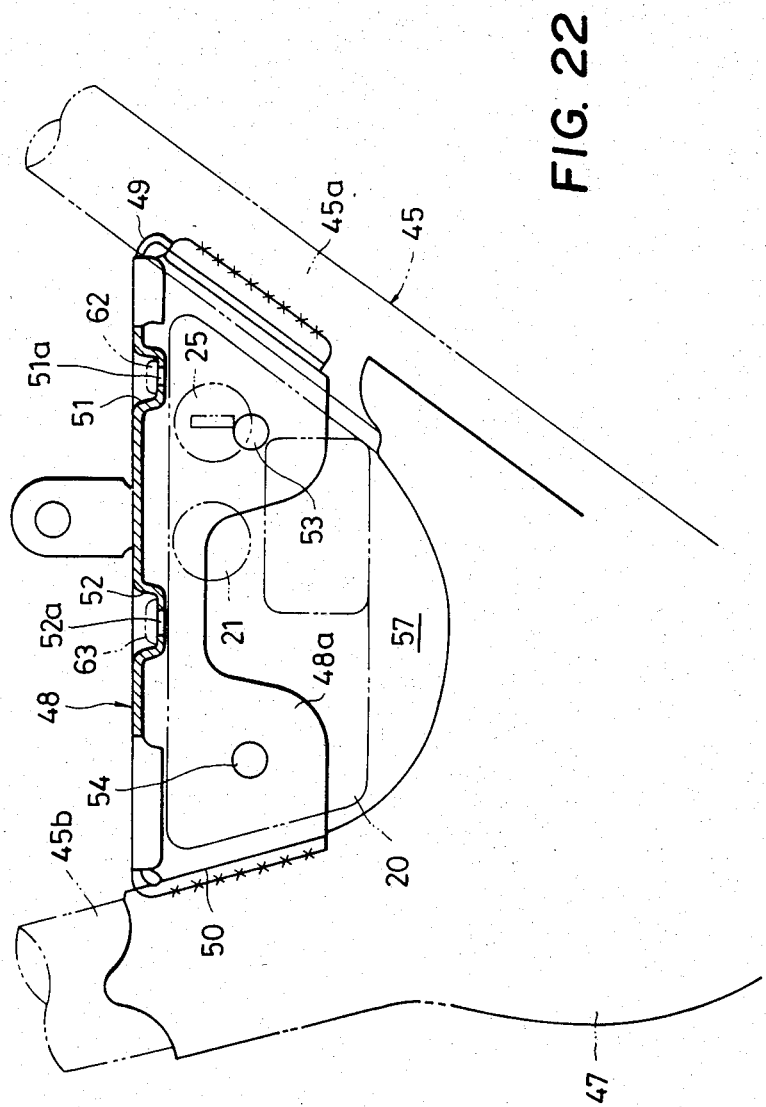
FIG. 22 is a front view, on an enlarged scale, of a portion of the motorcycle of FIG. 21 at which the device of the present invention is mounted on the motorcycle.

An example of mounting the theftproof device according to the invention onto a motorcycle will now be described with reference to FIGS. 21 through 23. According to the present example, as shown in FIG. 21, the main casing 20 is mounted in a lower space in a central framework 45 of the frame body of the motorcycle, on which is mounted a side cover 46 accommodating a battery, not shown. As shown in detail in FIGS. 22 and 23, a rear down tube 45a and a rear stay 45b, which form front and rear tubular members, are joined together in an intersecting manner by means of a gusset plate 47, to form a lower portion of the central framework 45. A support plate 48 is substantially horizontally interposed between the rear down tube 45a and the rear stay 45b, with its front and rear end edges folded and unremovably fitted over front and rear support frame members 49 and 50 formed of folded bars welded to the members 45a and 45b. The suport plate 48 has its upper surface formed therein with recesses 51 and 52 at suitable locations, which receses have their bottoms formed therein with mounting through holes 51a and 52a. The support plate 48 has an inner side wall 48a vertically extending from the upper surface at right angles thereto, which wall has bolt-fitting holes 53 and 54 formed therein at suitable locations. The casing body 20a of the main casing 20 has its upper surface and side surface formed with holes 55, 56, 60 and 61 at locations corresponding, respectively, to the above holes 51a, 52a, 53 and 54.

In mounting the main casing 20 onto the central framework 45 at its lower portion, the main casing 20 is inserted laterally of the frame body, into a substantially triangular space 57 defined between the members 45a, 45, 48 and 47 at the lower portion of the central framework work 45, to bring the upper surface of the main casing 20 under the support plate 48. Then, bolts 58 and 59 are screwed into the holes 60 and 61 in the main casing 20 through the corresponding holes 53 and 54 in the inner side wall 48a of the support plate 48, to provisionally retain the main casing 20 under the support plate 48. Bolts 62 and 63 are then screwed into the holes 55 and 56 in the main casing 20 from the upper side of the latter, through the corresponding holes 51a and 52a in the support plate 48, to thus firmly retain the main casing 20 under the support plate 48. After the main casing 20 has thus been supported by on the support plate 48, the bolts 62 and 63 have their heads embedded in the recesses 51 and 52 in the upper surface of the support plate 48. Further, a battery or like parts are supportedly arranged immediately on or at a slight distance from the upper surface of the support plate 48. These two structural features make it impossible to engage a screwdriver or a wrench with the bolts 62 and 63 to loose them for removal of the main casing 20 from the motorcycle.

Further, by virtue of the arrangement that the main casing 20 is arranged in the lower portion of the central framework 45, which forms a dead space in the body of the motorcycle, there is no need for creating a special space for accommodation of the main casing 20. Further, since the main casing 20 is mounted in the frame body of the motorcycle, which frame body alone cannot be removed from the motorcycle with ease, there is no fear that the main casing is removed and stolen together with its peripheral motorcycle parts.

While the invention has been described in its preferred embodiments, obviously modifications and variations will occur to those skill in the art within the scope of the present inventive concepts which are delineated by the following claims.

What is claimed is:
1. A theftproof device comprising:
an elongate flexible tying member having two ends;

an optical fiber longitudinally extending through said flexible tying member and having two ends, one end of said optical fiber being located at one end of said flexible tying member and another end of said optical fiber being located at the other end of said flexible tying member;

said flexible tying member having a looped portion including said other end thereof;

a light emission element arranged opposite one end of said optical fiber, for converting an electric signal supplied thereto into a corresponding photo signal;

a light receiving element arranged opposite another end of said optical fiber, for converting a photo signal supplied thereto into a corresponding electric signal;

at least one electric wire longitudinally extending through said flexible tying member adjacent said optical fiber, said electric wire being connected to a selected one of said light emission and light receiving elements for transmitting an electric signal transduced by the selected one of said elements, so that (i) when the electric wire is connected to the light emission element, the wire transmits an electric signal to be transduced to a photo signal by said light emission element, and (ii) when the electric wire is connected to the light receiving element, the wire transmits an electric signal which has been transduced from a photo signal by said light receiving element;

a fixture adapted to be fixed to an object which is to be protected from theft, said flexible tying member being adapted to have said one end thereof passed through said looped portion after said flexible tying member is wound around a solid structure adjacent said object to be protected from theft;

plug means provided at one end of said flexible tying member for mechanically connecting one end of said flexible tying member to said fixture, said plug means being adapted to disconnectably connect said one end of said flexible tying member to said fixture;

a caulking member caulked to join said other end of said flexible tying member to an end part of said looped portion opposite said other end of said flexible tying member, said caulking member accomodating one of said light emission and light receiving elements;

an electrical circuit arranged in said fixture for supplying an electric signal to said light emission element and also disposed to be supplied with an electric signal generated by said light receiving element; and connector means arranged within said plug means for electrically connecting said light emission element and said light receiving element to said electrical circuit, one of said light emission and light receiving elements being electrically connected to said connector means by way of said at least one electric wire;

said electrical circuit operating in a manner such that upon occurrence of a change in a photo signal generated by said light emission element and transmitted through said optical fiber, caused by disconnection or cutting of either said optical fiber or said at least one electric wire, said electical circuit is operable in response to a change in an electric signal supplied thereto from said light receiving element, which corresponds to said change in said photo signal, to perform a predetermined warning function.

2. The theftproof device as claimed in claim 1, wherein said mechanically connecting means comprises a plug secured to said at least one end of said flexible tying member; a socket mounted in said fixture for disengageable engagement with said plug; and a lock mounted in said fixture for locking said plug to said fixture.

3. The theftproof device as claimed in claim 2, wherein at least one of said light emission element and said light receiving element is mounted within said plug.

4. The theftproof device as claimed in claim 1, wherein said electrically connecting means comprises a first connector electrically connected to at least one of said light emission element and said light receiving element, and a second connector mounted in said fixture for disengageable engagement with said first connector.

5. The theftproof device as claimed in claim 4, wherein said mechanically connecting means comprises a plug secured to one end of said flexible tying member coresponding to said at least one of said light emission element and said light receiving element, and a socket mounted in said fixture of disengageable engagement with said plug, said first connector being arranged within said plug, and said second connector within said socket, respectively.

6. The theftproof device as claimed in claim 1, further comprising a capsule accommodating said one of said light emission element and said light receiving element, and wherein said capsule is located within said caulking member.

7. The theftproof device according to claim 1, wherein said electrical circuit comprises:

generator means connected to said light emission element for supplying thereto a first electric pulse signal having a predetermined pulse repetition period wherein the on-state duration is shorter than the off-state duration, to cause said light emission element to generate a corresponding photo pulse signal having a duration corresponding to the on-state duration of said first electric pulse signal, said photo pulse signal being coupled to said light receiving element through said optical fiber, receiver means connected to said light receiving element and responsive to a second electric pulse signal generated by said light receiving element in response to said photo pulse signal coupled thereto through said optical fiber, comparator means for comparing said first and second electric pulse signals and generating a predetermined signal when said first and second electric pulse signals are not coincident with each other, and warning means responsive to said predetermined signal generated by said comparator means to perform a predetermined warning function.

* * * * *